Dec. 13, 1927. C. C. FOSS ET AL Re. 16,816

ROTARY VALVE

2 Sheets-Sheet 1

Original Filed Nov. 13, 1924

WITNESSES

M. Fowler

INVENTOR

Christian C. Foss

Douglas D. DeTeach

BY Munn & Co.

ATTORNEYS

Dec. 13, 1927. C. C. FOSS ET AL Re. 16,816
ROTARY VALVE
2 Sheets-Sheet 2
Original Filed Nov. 13, 1924
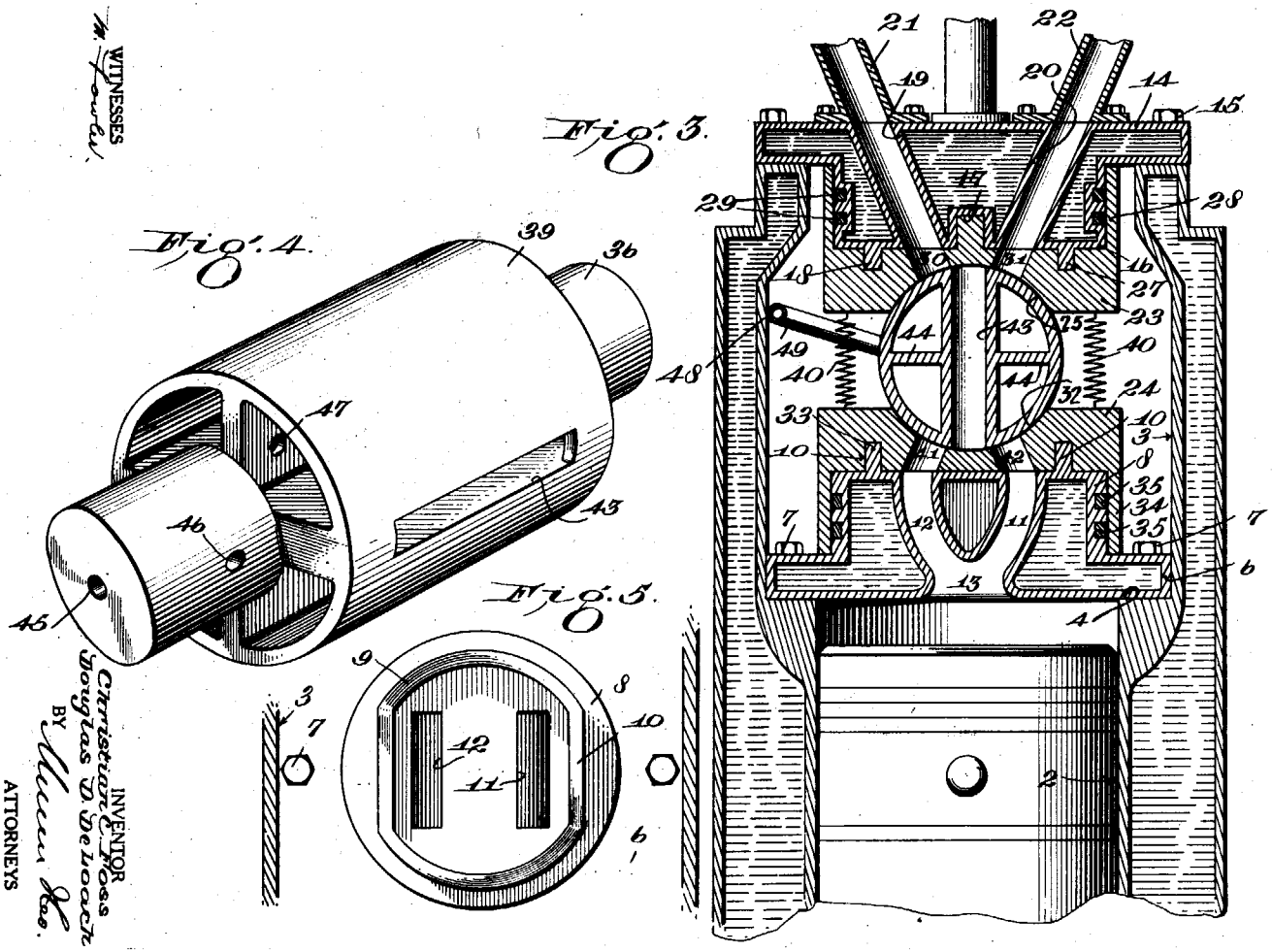
WITNESSES
M. Fowler.
INVENTOR
Christian C. Foss
Douglas D. DeLoach
BY Munn & Co.
ATTORNEYS Reissued Dec. 13, 1927.

Re. 16,816

UNITED STATES PATENT OFFICE.

CHRISTIAN C. FOSS, OF PINECASTLE, FLORIDA, AND DOUGLAS D. DE LOACH, OF SAVANNAH, GEORGIA, ASSIGNORS TO FOSS-DE LOACH COMPANY, OF SAVANNAH, GEORGIA, A CORPORATION OF GEORGIA.

ROTARY VALVE.

Original No. 1,576,591, dated March 16, 1926, Serial No. 749,728, filed November 13, 1924. Application for reissue filed November 2, 1927. Serial No. 230,669.

Our invention relates to improvements in rotary valves, more particularly to rotary valves for internal combustion engines, and it consists in the combinations, constructions and arrangements herein described and claimed.

An object of the invention is to provide a reliable and efficient rotary valve construction which will afford facilities for controlling the admission of fluid fuel to one or more cylinders of the internal combustion engine and the exhaust from the cylinders.

A further object of the invention is to provide a valve construction of the character described which when applied to a multi-cylinder internal combustion engine controls the admission of fuel to the respective cylinders and the exhaust therefrom so that both the admission of fuel to the respective cylinders and the exhaust therefrom occur in timed sequence.

A still further object of the invention is to provide a rotary valve construction having a valve seat comprising a plurality of sections movable relatively in respect to one another and to the rotary valve to compensate for wear on the relatively moving surfaces of the valve seat and the valve together with means acting automatically on the relatively movable sections of the valve seat to adjust the position of such sections in respect to one another to compensate for such wear.

A still further object of the invention is to provide a rotary valve construction of the character described which has means for conducting lubricant to the relatively moving surfaces of the valve construction.

Figure 1:
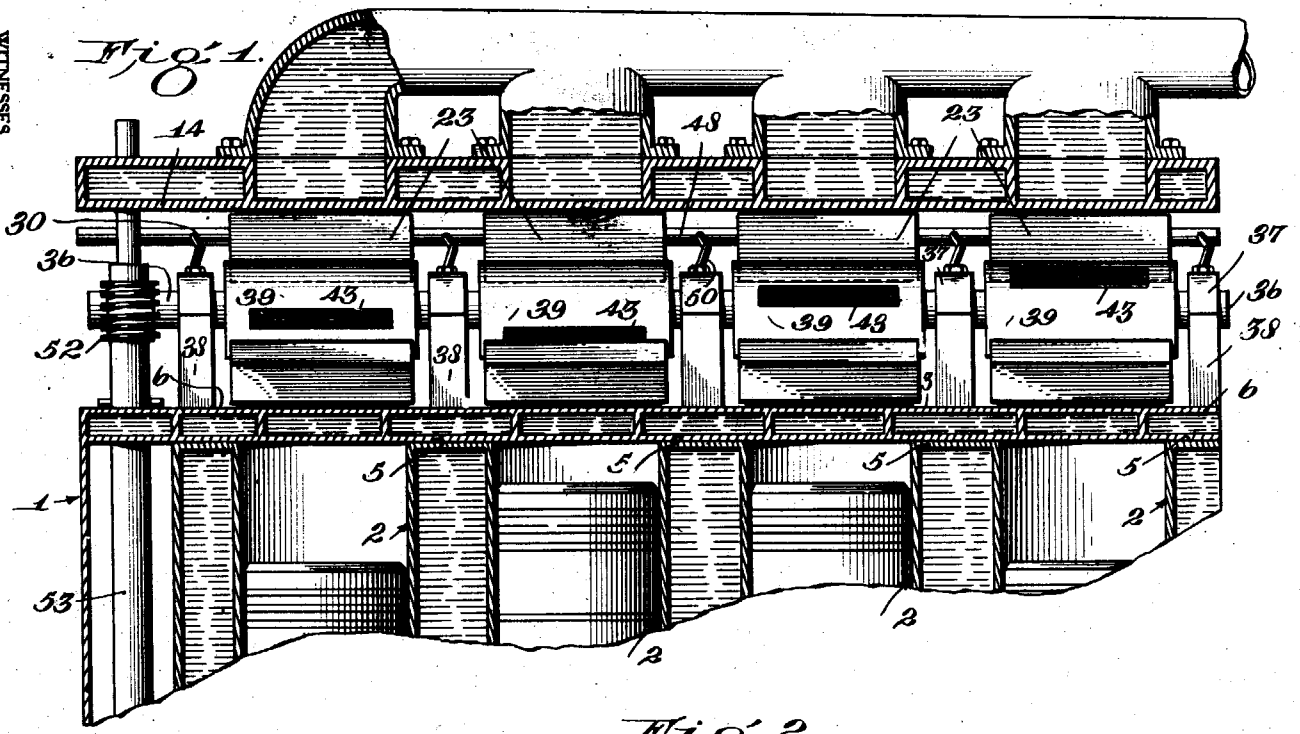
Figure 2:
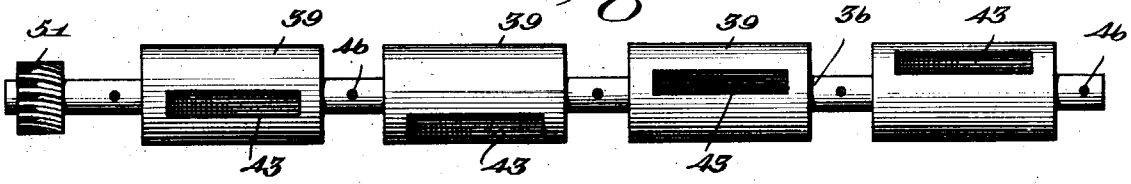

Other objects and advantages will be apparent from the following description, considered in conjunction with the accompanying drawings, in which:

Figure 1 is a view, mainly in vertical section, and partly in side elevation, showing a valve construction embodying the invention operatively applied to a multi-cylinder internal combustion engine, only portions of the latter being illustrated, Figure 2 is a side elevation of the rotary valve member of the device, Figure 3 is a transverse vertical section through the structure exhibited in Figure 1, the view being taken through one of the cylinders of the engine, Figure 4 is a perspective view of a portion of the rotary valve member, and Figure 5 is a horizontal section through a fragmentary portion of the engine block, looking down at the portion of the cover member which overlies one of the cylinders of the engine, parts of the valve construction being omitted.

In Figure 1, the numeral 1 designates an engine block which is formed to provide a plurality of vertically disposed cylinders 2 and a space 3 into which the bores of the cylinders open at their upper ends. As best seen in Figure 3, the width of the space 3 is greater than the diameter of each of the cylinders 2 so that a pair of shoulders as indicated at 4 are provided at opposite sides of the upper end of each of the cylinders, these shoulders constituting portions of the bottom wall 5 of the space 3. Both the bores of the cylinders 2 are water-jacketed as clearly shown in Figures 1 and 3 and as is usual in internal combustion engines.

The bores of the cylinders 2 are covered at their upper ends by a water-jacketed cylinder cover 6 which rests upon the bottom of the space 3 and may be attached to the bottom wall of the space 3 by cap bolts 7 or other fastening devices.

The portion of the cylinder cover 6 which overlies the bore of the cylinder is formed to provide an upstanding portion 8 which is circular in horizontal sectional contour and is enclosed at its upper end. A continuous rib consisting of opposite arcuate portions 9 connected by straight parallel portions 10 is upstanding from the top wall of the portion 8 which otherwise is flat. A pair of passages 11 and 12 respectively open in spaced apart relation through the top of the extension 8 within the space which is outlined by the continuous rib. The passages 11 and 12 converge toward their lower ends and join each other to provide a common opening indicated at 13 through the bottom wall of the portion of the cylinder cover 6 which overlies the bore of one of the cylinders 2, the opening 13 being in open communication with the bore of the cylinder.

The space 3 within the engine block is covered by an upper or top cover member 14 which is water jacketed as shown and is secured by cap bolts 15 or like fastening devices to the side walls of the engine block. The top cover 14 has pendant portions 16 of circular cross sectional contour corresponding in number and arrangement with the upstanding portions 8, each of the pendant portions 16 being directly above and in axial alignment with the corresponding portion 8. The corresponding portions 8 and 16 preferably are equal in diameter. The bottom wall of each pendant portion 16 is provided with a central cavity 17 and with a depending continuous rib 18 which preferably is directly above and similar to the upstanding rib on the underlying upstanding portion 8 of the cylinder cover. Except for the cavity 17 and the rib 18 the lower surface of the depending portion 16 is flat and horizontal.

A pair of ducts 19 and 20 extend obliquely through each pendant portion 16 of the top cover. The ducts 19 and 20 open at their lower ends through the bottom wall of the pendant portion 16 between the rib 18 and the central cavity 17 and at opposite sides of the latter. The duct 19 opens at its upper end through the top wall of the top cover 14 into a conduit 21 which is attached to the cover 14 while the duct 20 opens at its upper end into a conduit 22 which also is attached to the top cover 14. It is to be observed at this point that the duct 19 opens at its lower end in confronting relation to the upper end of the passage 11 while the duct 20 is similarly located in respect to the upper end of the duct 12.

The means for controlling communication between the duct 20 and the passage 12 and between the duct 19 and the passage 11 will now be described. Such means comprises a pair of relatively movable upper and lower valve seat members indicated respectively at 23 and 24 and located between each pair of vertically aligned sections 16 and 8 or in other words over each cylinder 2. The upper valve seat member 23 comprises a block having a cavity 25 in the lower face of the central portion thereof, the cavity 25 being concavely curved in cross sectional contour for a purpose to be presently set out. The block of the upper valve seat member is provided with a central upstanding guide lug 26 adapted to enter the recess or socket 17 and with a continuous groove 27 for the reception of the rib 18. The block of the upper valve seat member is provided with an upstanding marginal extension of cylindrical form which is indicated at 28 and which receives the pendant overlying portion 16 of the top cover of the engine block and is in sliding contact with said portion 16. Packing rings 29 which are received in peripheral grooves in the pendant portion 16 are held therein by the overlapping cylindrical extension 28 of the upper valve seat member and provide a fluid tight seal between the extension 28 and the pendant portion 16. The block portion of the upper valve seat member has a passage 30 extending therethrough in alignment with the duct 19 and a second passage 31 extending therethrough in alignment with the duct 20, both of said passages terminating at their lower ends in the bottom wall of the cavity 25.

The lower valve seat member 24 is identical in essential respects with the upper valve seat member and includes a block portion which overlies one of the extensions 8 and has a recess 32 in its upper face directly beneath the cavity 25 of the corresponding upper valve seat member and also has a continuous groove 36 in its lower face for the reception of the upstanding rib 10 on the underlying portion 8 of the cylinder cover. The cavity 32 is concavely curved in cross sectional contour and is of the same size and shape as the overlying cavity 25. A cylindrical marginal extension 34 which depends from the block portion of the lower valve seat member overlaps the upstanding portion 8 and is in sliding contact with the latter. The cylindrical portion 34 retains in place packing rings 35 which are received in peripheral grooves in the encircled portion 8.

A shaft 36 is journaled at intervals along its length in horizontally aligned bearings 37 at the upper ends of supports 38 which are upstanding from the bottom of the space 3 within the latter, the shaft extending longitudinally of the space 3 and being provided with an enlarged cylindrical portion 39 for each pair of valve seat members 23 and 24 and therefore for each cylinder 2. Each enlarged valve portion 39 is disposed between corresponding upper and lower valve seat members and is partially received in the cavities 25 and 32 of such valve seat members, the length of the enlargement 39 being slightly less than the length of the cavities 25 and 32 and the curvature of the outer wall of the enlargement corresponding to the transverse curvature of the bottom wall of the cavities 25 and 32. Corresponding upper and lower valve seat members 23 and 24 are continuously held in close contact with the enlargement 39 which extends therebetween by a pair of tension springs 40 which connect the block portions of corresponding upper and lower valve seat members. It should be observed at this point that the block portion of each lower valve seat member has a passage 41 which is in line with the passage 31 of the corresponding upper valve seat member and a passage 42 which is in line with the passage 30 of the corresponding upper valve seat member and that each enlargement 39 is provided with a passage 43 which extends diametrically therethrough and preferably corresponds in cross sectional contour and area with each of the passages 30, 31, 41 and 42. The enlargement 39 is preferably hollowed out for the sake of likeness except for the walls of the passage 43, leaving webs 44 which stay the walls of the passage 43 to the walls of the cylindrical enlargement and to the adjacent portion of the shaft 36.

From the foregoing description, it will be manifest that the enlargement 39 constitutes a valve for controlling passage of fluid between the aligned passages 31 and 41 and between the aligned passages 30 and 42. The shaft 36 is provided with an axial bore 45 through which a suitable lubricant may be forced in any suitable known manner. Lateral passages 46 extend from the bore 45 radially through the shaft 36 at intervals along the length of the shaft and still other passages 47 extend obliquely to the bore 45 through the web portions 44 of the valves 29. The pipe 48 for conducting lubricant has branches 49 adapted to discharge against the periphery of the enlargements 39 and has other branches 50 which lead to the bearings 37. The shaft 36 is provided at one of its ends with a worm gear 51 in mesh with a worm 52 on a rotating part 53 of the engine.

From the foregoing description of the various parts of the device, the operation thereof may be readily understood. In actual practice, one of the conduits 21 or 22 is a branch of the intake manifold and the other conduit is a branch of the exhaust manifold for the engine. A carbureted mixture passes through the intake manifold along one of the branches 21 or 22 through one of the passages 19 or 20 and the aligned passage 30 or 31 in the upper valve seat member for each cylinder and through the valve 39 for that cylinder when the passage 43 of that particular valve is in line with the passage 30 or 31 then through one of the passages 41 or 42 and the aligned passage 12 or 11 and opening 13 into the cylinder. After combustion has taken place in the cylinders, the exhaust gas will pass through the passage 12 or 11 and the passage 41 or 42 and through one of the passages 30—19 or 31—20 into the conduit 21 or 22, whichever is a branch of the exhaust manifold. It will be observed by referring to Figure 2 that the passages 43 of the respective valves 39 are spaced circumferentially of the shaft so that a carbureted mixture will be admitted to each cylinder at a time other than that at which the carbureted mixture is admitted to the remaining cylinders and that the exhaust from each cylinder will take place at a time other than that at which the exhaust will take place from the remaining cylinders. Combustion therefor may take place in the respective cylinders in timed sequence since the shaft is rotated by motion imparted thereto from a rotating part of the engine.

Should wear take place on the contiguous surfaces of one of the valves 39 and the valve members which are associated therewith, the springs 40 which connect said valve members will function to draw the valve members toward each other to compensate for the wear. The means hereinbefore described for conducting lubricant to the relatively moving surfaces of the valve constructions insures easy rotation of the valves with but very little wear on the relatively moving parts of the device.

We claim:

1. In an internal combustion engine, an engine block having a cylinder bore and a space above said bore, a cylinder cover having an extension upstanding therefrom, a cover for the space above said cylinder bore, said last named cover having a portion depending therefrom and overlying said upstanding extension, a lower valve seat member supported on said upstanding extension and movable vertically, an upper valve seat member engaged with said depending portion of the second cover, and a rotary valve supported between said valve seat members, said valve having a transverse passage therethrough.

2. In an internal combustion engine, an engine block having a cylinder bore and a space above said bore, a cylinder cover having an extension upstanding therefrom, a cover for the space above said cylinder bore, said last named cover having a portion depending therefrom and overlying said upstanding extension, a lower valve seat member supported on said upstanding extension and movable vertically, an upper valve seat member slidably engaged with said depending portion of the second cover, a rotary valve supported between said valve seat members, said valve having a transverse passage therethrough, each of said valve seat members and the adjacent cover having a pair of spaced passages therethrough, the passages in the valve seat members being aligned with the corresponding passages in the adjacent cover and each passage in the valve seat members being adapted to register with each end of the passage in the valve during each rotation of the latter.

3. In an internal combustion engine, an engine block having a cylinder bore and a space above said bore, a cylinder cover having an extension upstanding therefrom, a cover for the space above said cylinder bore, said last named cover having a portion depending therefrom and overlying said upstanding extension, a lower valve seat member supported on said upstanding extension and movable vertically, an upper valve seat member slidably engaged with said depending portion of the second cover, a rotary valve having a transverse passage therethrough, and packing means between each valve seat member and the adjacent extension to one of said covers.

4. In an internal combustion engine, an engine block having a cylinder bore and a space above said bore, a cylinder cover having an extension upstanding therefrom, a cover for the space above said cylinder bore, said last named cover having a portion depending therefrom and overlying said upstanding extension, a lower valve seat member supported on said upstanding extension and movable vertically, an upper valve seat member engaged with said depending portion of the second cover, a rotary valve supported between said valve seat members, and means for urging said valve seat members into engagement with said valve.

5. In an internal combustion engine, an engine block having a cylinder bore and a space above said bore, a cylinder cover having an extension upstanding therefrom, a cover for the space above said cylinder bore, said last named cover having a portion depending therefrom and overlying said upstanding extension, a lower valve seat member supported on said upstanding extension and movable vertically, an upper valve seat member slidably engaged with said depending portion of the second cover, a rotary valve supported between said valve seat members, said valve having a transverse passage therethrough, and tension spring means connecting said valve seat members, each of said valve seat members and the adjacent cover having a pair of spaced passages therethrough, the passages in the valve seat members being alined with the corresponding passages in the adjacent cover and each passage in the valve seat members being adapted to register with each end of the passage in the valve during each rotation of the latter.

In testimony whereof we affix our signatures.

CHRISTIAN C. FOSS.
DOUGLAS D. DE LOACH.